(12) United States Patent
Signorino

(10) Patent No.: US 7,002,786 B2
(45) Date of Patent: Feb. 21, 2006

(54) DEVICE AND METHOD FOR DISCHARGING ELECTRIC CHARGES

(76) Inventor: Giovanni Signorino, Via Consolare Antica 718, 98071 Capo d'Orlando (IT)

( * ) Notice: Subject to any disclaimer, the term of this patent is extended or adjusted under 35 U.S.C. 154(b) by 161 days.

(21) Appl. No.: 10/333,968

(22) PCT Filed: Jul. 16, 2001

(86) PCT No.: PCT/EP01/08187

§ 371 (c)(1),
(2), (4) Date: Mar. 21, 2003

(87) PCT Pub. No.: WO02/09979

PCT Pub. Date: Feb. 7, 2002

(65) Prior Publication Data

US 2003/0161087 A1    Aug. 28, 2003

(30) Foreign Application Priority Data

Jul. 27, 2000  (IT)  .................... ME2000A0006

(51) Int. Cl.
  *H05F 3/00*  (2006.01)
(52) U.S. Cl. ..................................... 361/216
(58) Field of Classification Search ........... 361/216, 361/212, 220
  See application file for complete search history.

(56) References Cited

U.S. PATENT DOCUMENTS

| 4,145,864 A | * | 3/1979 | Brewster, Jr. ............ 56/10.2 R |
| 5,179,497 A | | 1/1993 | Bakhoum |
| 5,825,605 A | * | 10/1998 | Sutherland .................. 361/216 |

FOREIGN PATENT DOCUMENTS

| DE | 36 06 975 A | 9/1987 |
| DE | 197 45 869 A | 5/1998 |
| GB | A2322839 | 9/1998 |
| JP | 61006049 | 11/1986 |
| JP | 404183439 A * | 6/1992 ................. 600/510 |
| JP | 08227797 | 3/1996 |
| WO | WO 92/20201 | 11/1992 |

* cited by examiner

*Primary Examiner*—Brian Sircus
*Assistant Examiner*—Boris Benenson

(57) ABSTRACT

The present device eliminates electrostatic discharges when getting out of the car, exploiting the principle of transfer of the surface electric charges by difference of potential. This avoids all the problems caused by electrostatic discharges: sudden explosion of airbags, problems for people with implants of any type and general discomfort caused by said discharges.

23 Claims, 1 Drawing Sheet

US 7,002,786 B2

DEVICE AND METHOD FOR DISCHARGING ELECTRIC CHARGES

FIELD OF THE INVENTION

The present invention concerns a device and a method to prevent electrostatic charges from passing through the human body when getting out of the car and closing the door.

BACKGROUND ART

These charges accumulate on the surface of the car due to various causes, such as ionisation of the air caused by lightning, friction due to movement of the car through the air, friction of the various belts in the engine pulley grooves, lack of humidity in the air, $CO_2$ from combustion, electrical fields etc.

These charges accumulate also in persons due to friction of synthetic underwear against the body and rubbing against the car seats; said charges reach voltage values of several tens of thousands of volts.

The phenomenon is perceived when the person puts his feet on the ground and at the same time pushes the car door to close it.

At present, a device commonly sold on the market consists of a flexible strip of conducting rubber earthed to the bodywork at one end with the other end trailing along the ground.

This system does not always work, however, for various reasons.

SUMMARY OF THE INVENTION

According to an aspect of the present invention, a device is disclosed having the feature according to claim 1; according to another aspect of the present invention, a method is disclosed having the features according to claim 8.

BRIEF DESCRIPTION OF THE FIGURES

Further advantages of the present invention will appear more evidently to a man skilled in the art, from the following detailed description, with reference to the attached Figures, where.

DETAILED DESCRIPTION OF THE INVENTION

Figure 1:
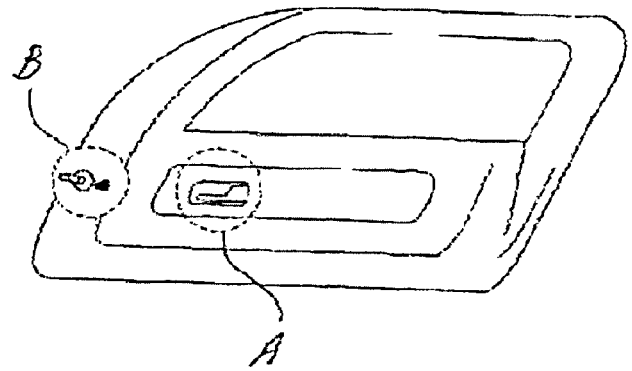
FIG. 1 shows schematically a front view of the installation of a particular embodiment of the invention on a car door.
Figure 2:
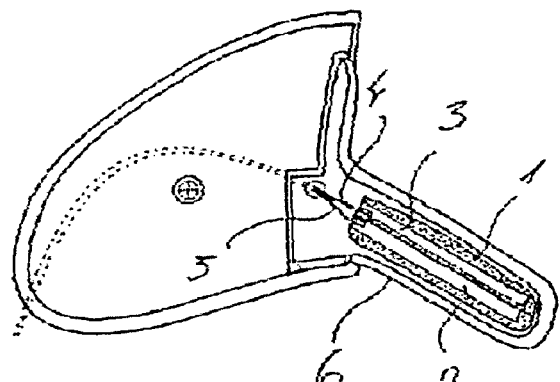
FIG. 2 shows schematically the detail of the zone A of FIG. 1, with the device of FIG. 1 installed on the door opening handle.

According to a preferred embodiment of the present invention, described as a non limiting example, the discharging device can consist of two copper tracks 1,2 on a flat rectangular strip of mylar 3, insulated from each other and at a distance for example of two millimetres; for example, the dimensions of this flat strip 3 can be two centimetres by seven and the back of the strip is adhesive. Two thin flexible copper conductors 4,5 insulated in sheaths, length approximately one metre, are welded at the ends of the two metal tracks 1,2.

The flat strip 3 can be cut with a pair of scissors to adapt it to the size and shape of the inside car door opening handle 6. Having removed the protective film of the adhesive, it is glued to the handle 6 so that every time the door is opened to get out of the car, the person's fingers come simultaneously into contact with the two copper tracks 1,2.

If there are electrostatic charges on the person's body, they will be discharged along the conductors 4,5, whether positive or negative.

Figure 3:
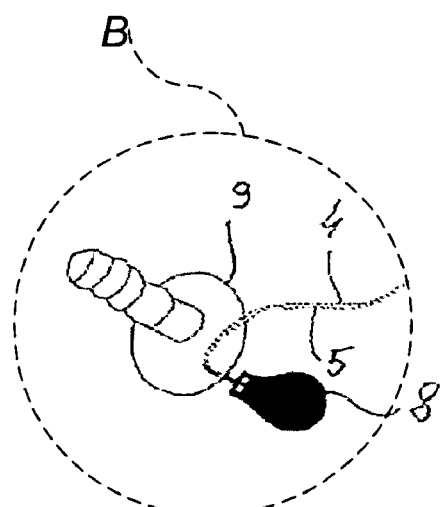
FIG. 3 shows schematically the detail of zone B of FIG. 1, with the installation of the battery of the device of FIG. 1.
Figure 4:
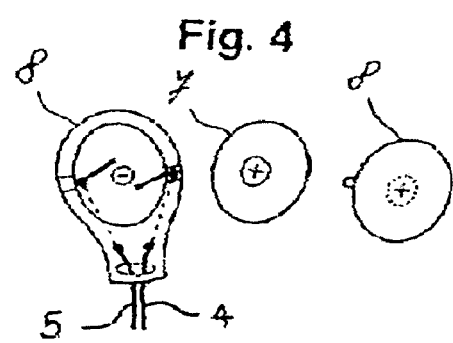
FIG. 4 shows an exploded schematic view of the battery and its housing, in the device of FIG. 1.

These copper conductors 4, 5 pass inside the door panel and come out near the hinges where other cables are generally conveyed. The ends of these conductors 4, 5, stripped of the insulating sheath for a stretch of approximately 30 millimeters, will be connected to the poles of a small 3 volt battery 7—or a battery of any suitable voltage—positioned in a container 8. As illustrated in FIG. 4, when the battery 7 is inserted in container 8, each conductor 4 and 5 contacts a different battery pole. This container 8 has a spongy adhesive support 9 so that it can be easily glued onto the door wing and simultaneously keep two portions of conductors 4,5 (at a distance from each other) permanently in contact with the car door paint, before connection to the battery poles; this way the 3 volt battery 7 and the conductors 4,5 realize an electric circuit not grounded with the car iron body or the earth itself. The 3 volts battery 7 then disperses the electrostatic charges it accumulates because of the air humidity, oxydation processes and the other factors which usually cause a battery discharge. The electric resistance of the car paint avoid that the two stripped conductor parts are short-circuited, and the distance between the stripped connectors will be accordingly determined to avoid short-circuits as well. More precisely, as illustrated in the detail of FIG. 3, the container 8 is connected to a spongy adhesive support member 9 the latter having a shape such that the assembly can be easily glued to a part of the door wing of the vehicle at the area of the hinges of the door onto the car paint, as generally depicted in FIG. 1. The spongy member supports a part of conductors 4 and 5. Thus, when the spongy member is mounted onto the vehicle part, the non-insulated parts of conductors 4 and 5 electrically contact the surface of the vehicle, but not each other.

In this case, advantageously one conductor 4 is connected to the ground battery pole, and the other conductor 5 is connected to the positive battery pole.

This system should help to solve problems such as sudden explosion of airbags, faulty operation of electronic control units and various devices on the car, hazards for people with pace-makers, eyes and ears with artificial parts, problems for people with any type of metal prosthesis and general discomfort for everyone caused by the phenomenon.

The above described device can be modified in several ways without departing from the present invention: generally, the copper conductors 1,2, or whatever conductive track, can be fixed to other parts 6 of a passenger compartment, and not necessarily on the passenger compartment side of the doors, or even on other parts outside the passenger compartment; the conductors 4,5 can be electrically connected to any suitable capacitive bipolar element 7, where capacitive bipolar element 7 means every electric component having suitable electric capacity, like for example a capacitor; likewise the stripped parts of the conductors 4,5 can be set in contact with the paint in other points of the body which are not necessarily the passenger compartment side of the doors; the strip of mylar 3 can be alternatively any other suitable support. Further modifications, obvious for a man skilled in the art, are of course possible.

The invention claimed is:

1. A method for discharging electric charges from a vehicle, comprising the step of setting at least two electric conductors, each having respective non-insulated parts, onto a predetermined part of a vehicle passenger compartment, in such a position that each non-insulated part comes simultaneously into contact with a passenger when the passenger grasps said predetermined part; and connecting each of said at least two electric conductors to a different pole of a capacitive bipolar element.

2. The method according to claim 1, wherein said predetermined part of the passenger compartment belongs to a door.

3. The method according to claim 2, wherein said predetermined part comprises a door handle.

4. The method according to claim 1, wherein each of said conductors is in electrical contact with the bodywork coating.

5. The method according to claim 1, wherein one of said at least two conductors is connected to a positive vehicle battery pole, and the other of said at least two conductors is electrically connected to a vehicle body pole.

6. The method according to claim 1, wherein said at least two conductors are connected to the poles of a storage cell electrically insulated from the earth and a vehicle body.

7. A device for discharging electric charges from a vehicle, comprising:
   a capacitive bipolar element;
   at least two different electric conductors, located on a vehicle, for discharging electric charges from a passenger in the vehicle, each of said two electric conductors is connected to a different pole of said capacitive bipolar element and also has a non insulated part;
   wherein said non insulated parts are set, not short circuited with each other, on a predetermined part of a vehicle passenger compartment, in such a position one with respect to the other that the passenger, while grasping said predetermined part of the passenger compartment, comes simultaneously into contact with both of said at least two non-insulated parts.

8. The device according to claim 7, wherein each of said at least two electric conductors is electrically connected to a different point of the bodywork coating.

9. A device for discharging electric charges, comprising:
   a capacitive bipolar element; and
   at least two electric conductors each of which is electrically connected to a different pole of said capacitive bipolar element and has a non-insulated part thereon;
   a part of the passenger compartment of a vehicle, where each of said non-insulated parts is set on said part of the passenger compartment in such a position, one with respect to the other, that a passenger, while grasping said part of the passenger compartment, comes simultaneously into contact with both of said at least two non-insulated parts, such that any electric charge is discharged.

10. The device according to claim 9, wherein said capacitive bipolar element comprises a storage cell.

11. The device according to claim 9, wherein each of said at least two electric conductors comprises a stripped part suitable to be set in electrical contact with the car paint.

12. The device according to claim 9, wherein said at least two electric conductors are electrically connected each of them to a different point of the bodywork coating of the vehicle.

13. The device according to claim 11, wherein one of said at least two conductors is connected to the positive pole of the vehicle battery, and another of said at least two conductors is connected to a vehicle ground pole.

14. The device according to claim 9, wherein said capacitive bipolar element comprises a battery electrically insulated from the earth and the vehicle body.

15. The method of claim 1, wherein said capacitive bipolar element comprises a storage cell.

16. The method of claim 1, wherein said capacitive bipolar element comprises a battery.

17. The method of claim 1, wherein said capacitive bipolar element comprises means for accumulating electric charges.

18. The device of claim 7, wherein said capacitive bipolar element comprises a storage cell.

19. The device of claim 7, wherein said capacitive bipolar element comprises a storage battery.

20. The device of claim 7, wherein said capacitive bipolar element comprises means for accumulating electric charges.

21. The device of claim 9, wherein said capacitive bipolar element comprising means for accumulating electric charges.

22. The device of claim 9, further comprising a flat support, wherein each of said non-insulated parts comprises an electrically conductive track fixed on said support, and where said support and said conductive tracks are suitable to be set on the part.

23. The device according to claim 10, wherein said storage cell consists essentially of the vehicle battery.

* * * * *

UNITED STATES PATENT AND TRADEMARK OFFICE
CERTIFICATE OF CORRECTION

PATENT NO. : 7,002,786 B2 Page 1 of 1
APPLICATION NO. : 10/333968
DATED : February 21, 2006
INVENTOR(S) : Giovanni Signorino It is certified that error appears in the above-identified patent and that said Letters Patent is hereby corrected as shown below:

In the coversheet: At (54) DEVICE AND METHOD FOR DISCHARGING ELECTRIC CHARGES should read
DEVICE AND METHOD FOR DISCHARGING STATIC ELECTRIC CHARGES Signed and Sealed this Twenty-first Day of August, 2007

JON W. DUDAS
*Director of the United States Patent and Trademark Office*